United States Patent [19]
McCarthy et al.

[11] Patent Number: 6,092,635
[45] Date of Patent: Jul. 25, 2000

[54] MULTIPLE-FUNCTION CONTROLLABLE OVERRUNNING COUPLING

[75] Inventors: James Paul McCarthy, Milford; Norman Szalony, Brighton; Rick David Watson, Lambertville, all of Mich.

[73] Assignee: Ford Global Technologies, Inc., Dearborn, Mich.

[21] Appl. No.: 09/228,129

[22] Filed: Jan. 11, 1999

[51] Int. Cl.$^7$ ............................................. F16D 3/34
[52] U.S. Cl. ............................................. 192/45; 192/41 R
[58] Field of Search ..................... 192/45, 44, 45.1, 192/38, 47, 85 AT

[56] References Cited

U.S. PATENT DOCUMENTS

| | | | |
|---|---|---|---|
| 1,443,248 | 1/1923 | Defordt | 192/44 |
| 1,893,231 | 1/1933 | Floyd . | |
| 2,039,149 | 4/1936 | Dodge . | |
| 3,021,925 | 2/1962 | Osborne . | |
| 3,054,488 | 9/1962 | General et al. . | |
| 3,487,900 | 1/1970 | Dahl . | |
| 3,746,136 | 7/1973 | Marola et al. . | |
| 3,820,640 | 6/1974 | Marola et al. . | |
| 4,341,294 | 7/1982 | Kerr . | |
| 4,770,054 | 9/1988 | Ha . | |
| 5,067,598 | 11/1991 | Ritter et al. . | |
| 5,103,950 | 4/1992 | Ito et al. . | |
| 5,638,931 | 6/1997 | Kerr . | |

FOREIGN PATENT DOCUMENTS

| | | |
|---|---|---|
| 965360 | 4/1975 | Canada . |
| 1115221 | 12/1981 | Canada . |
| 64-21264 | 1/1989 | Japan . |

*Primary Examiner*—Rodney H. Bonck
*Assistant Examiner*—Tisha D. Waddell
*Attorney, Agent, or Firm*—Frank G. McKenzie; Roger L. May

[57] ABSTRACT

A multiple-function mechanical coupling having inner and outer races, the outer race having an internal surface with peripherally spaced pockets defining ramp surfaces, the inner race having an outer surface with peripherally spaced pockets defining ramps that are situated adjacent corresponding ramp surfaces of the outer race. The inner race surrounds a circular torque transfer shaft. The inner race is split to permit radial expansion of the effective diameter of the inner race. A hydrostatic pressure actuator exerts a tangentially directed force on the adjacent ends of the inner race. A plurality of clutch rollers is received in the recesses in the inner surface of the outer race and the outer surface of the inner race whereby the races are locked together and the inner race establishes frictional engagement of the torque delivery.

8 Claims, 5 Drawing Sheets

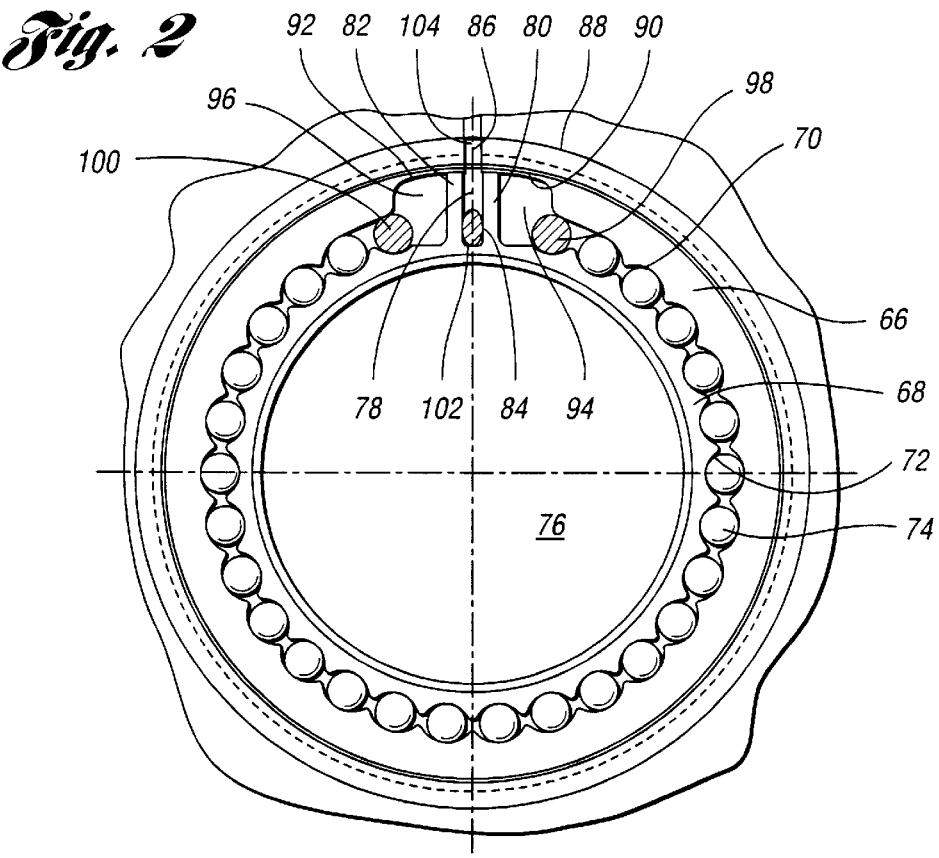
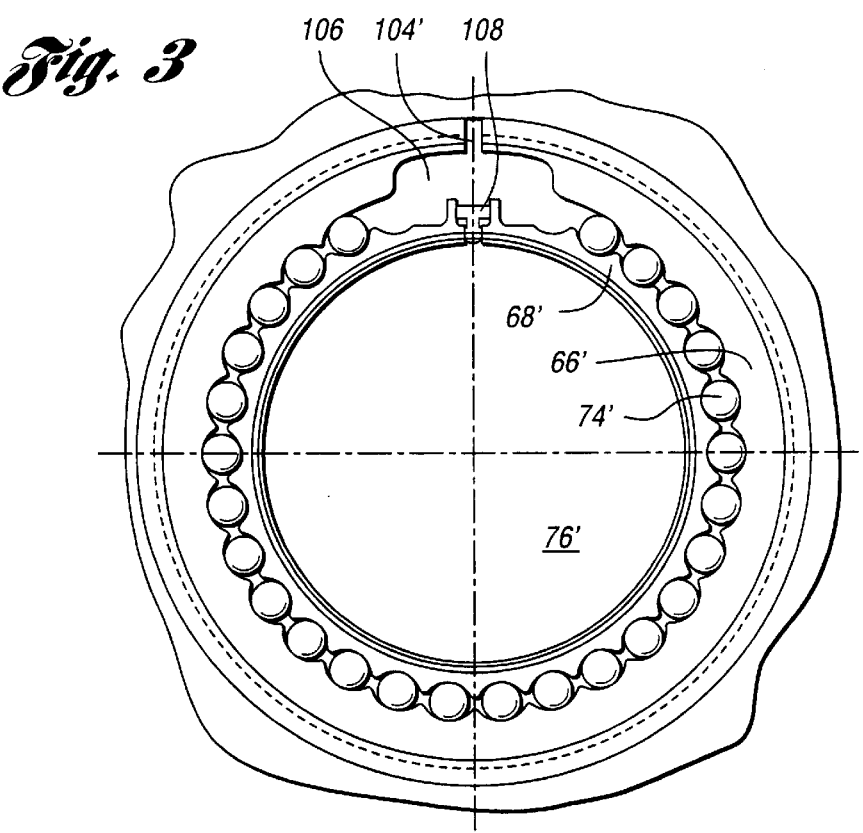

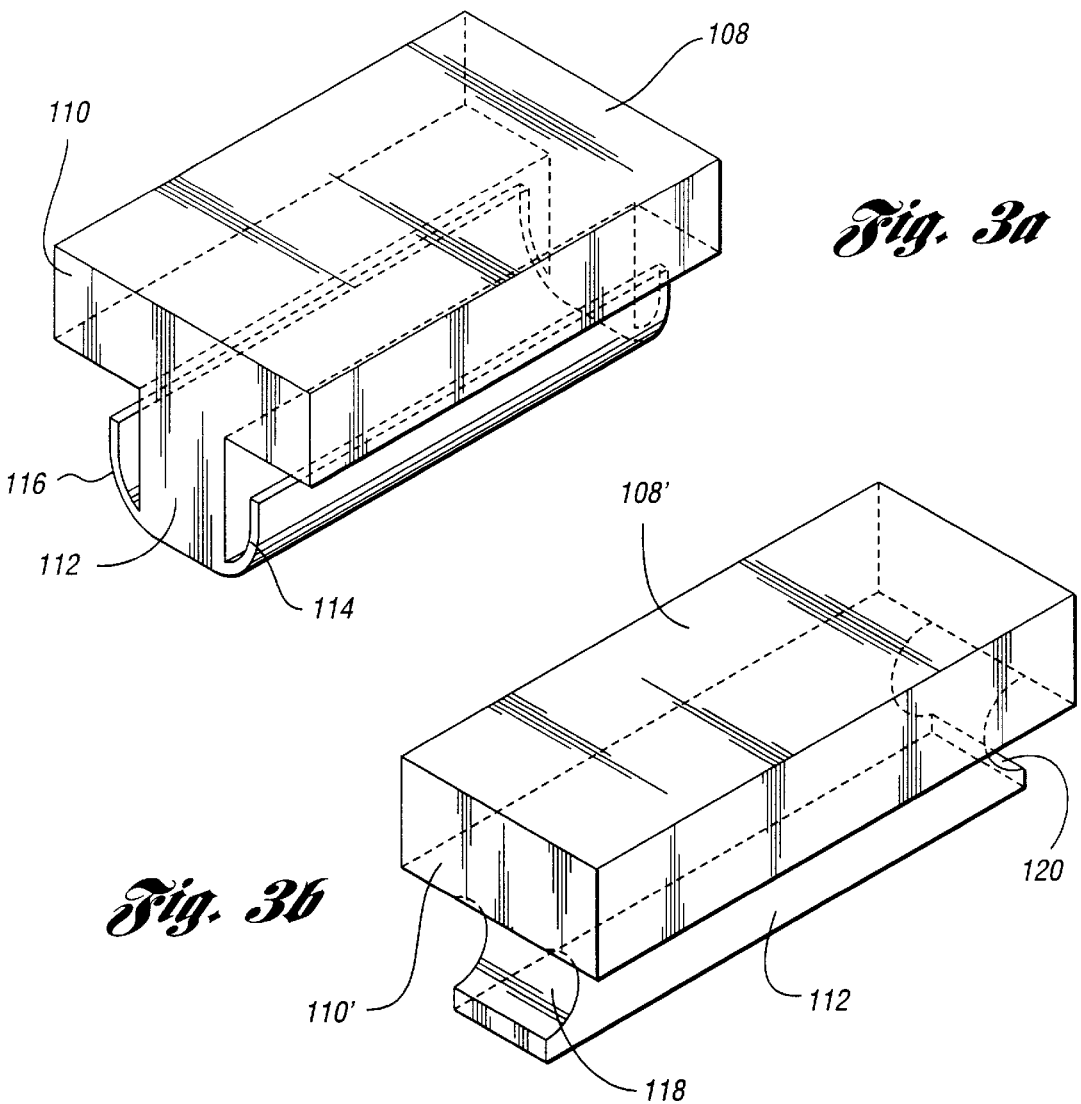
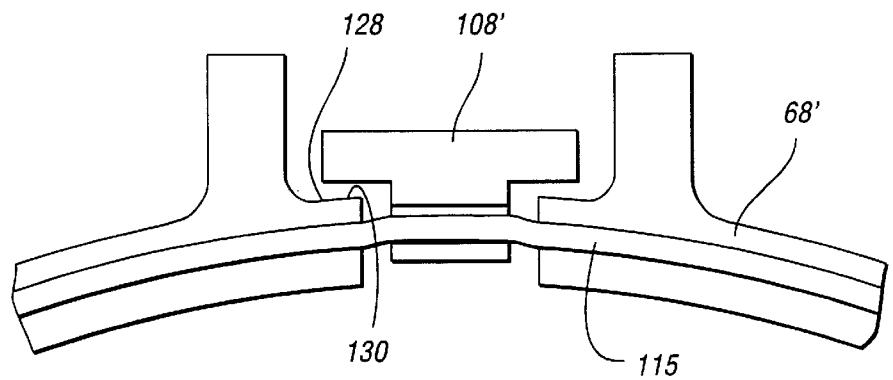

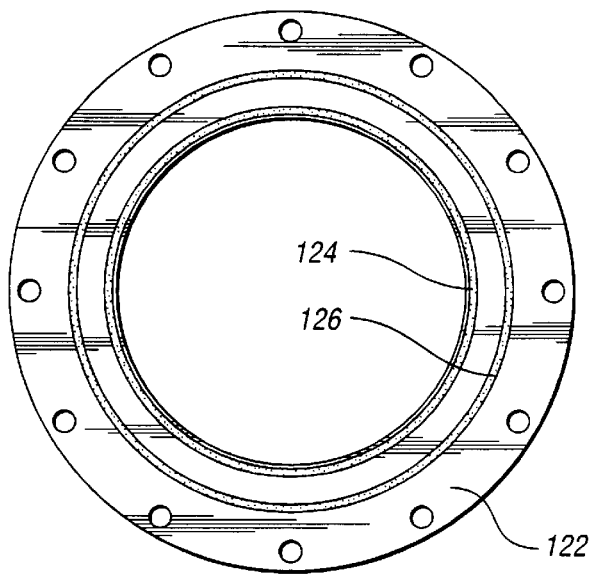
Fig. 5
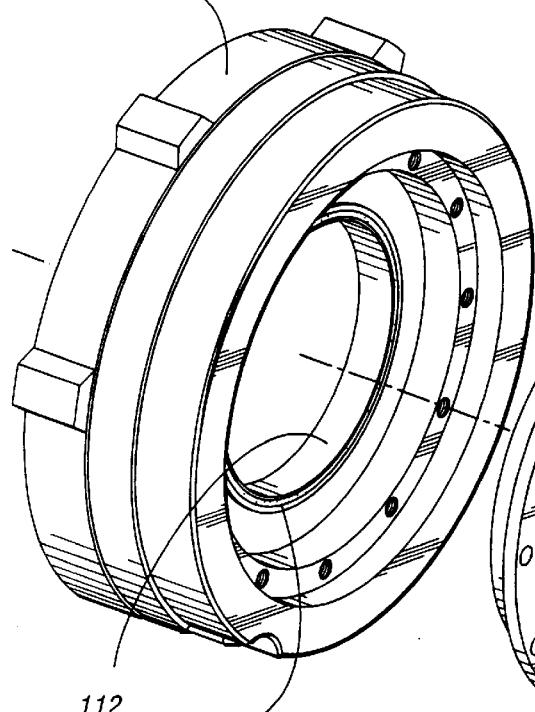
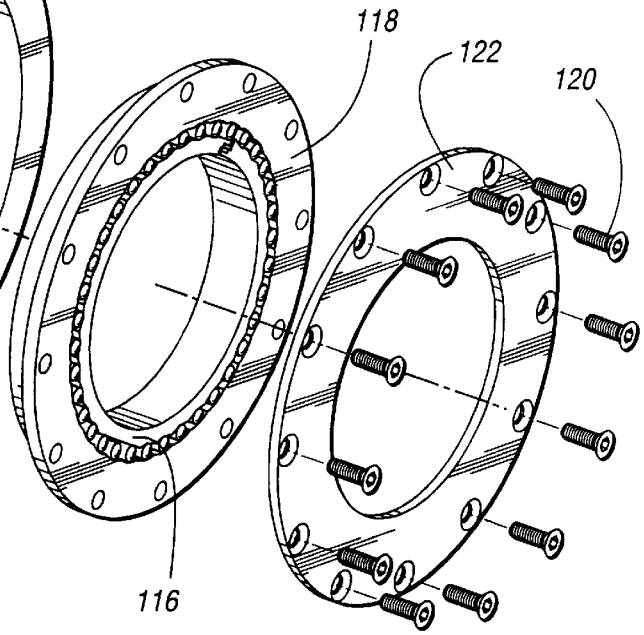
Fig. 6

MULTIPLE-FUNCTION CONTROLLABLE OVERRUNNING COUPLING

TECHNICAL FIELD

The invention relates to a multiple-function mechanical clutch having inner and outer races for controlling the motion of a torque transfer shaft in a power transmission mechanism.

BACKGROUND OF THE INVENTION

Torque transfer drives for use with an engine in an automotive vehicle driveline may include a spiral, one-way clutch such as the clutch shown in U.S. Pat. No. 5,638,931 and 4,341,294, which issued to John H. Kerr. The Kerr clutch consists of inner and outer clutch rings with rollers that are located between the races. The rollers are engageable with spiral surfaces formed on the inner surface of the outer race and the on the outer surface of the inner race. The rollers are arranged in segments that are peripherally spaced about the axis of the clutch.

The inner race of the Kerr design is split. It surrounds a torque delivery shaft and is engageable with the outer shaft surface. A slight frictional drag at the shaft surface exists as the shaft rotates relative to the inner race. When the shaft rotates relative to the inner race, the inner race tends to follow the motion of the shaft because of the frictional drag. This causes the rollers to climb spiral surfaces and produces a radial inward force on the split inner race, which significantly increases the frictional drag. This effects a self-energizing lockup of the clutch. The locking action occurs in both directions of relative rotation of the races.

In an alternate design of Kerr, the races are formed with peripherally spaced recesses that receive clutch rollers. Bidirectional control of the torque transfer between the inner race and the shaft can be achieved with the alternate Kerr design by alternately restraining circumferential motion of the ends of the split inner race. When one end of the inner race is prevented from shifting angularly, the rollers will not effect a wedging state to lock up the clutch when relative motion of the shaft occurs in one direction. When angular motion of both ends are restrained, the clutch inner race would be centered relative to the outer race, thereby permitting overrunning motion of the shaft regardless of the direction of rotation of the shaft relative to the inner race.

Although a bidirectional clutch of the type developed by Kerr is usable in an accessory drive for an automotive vehicle driveline, it could not successfully be used in a multiple-ratio torque transmission mechanism wherein both rotation of the inner cam ring and the outer housing and coasting engine braking would be required. To achieve coasting engine braking, the clutch must instantaneously switch lockup directions upon a torque reversal. This would require an actuator with a high response rate. Further, the actuator would require a reliable sensor to trigger the operation of the clutch at the instant the torque reversal event occurs or at the instant the actuator is triggered in response to an inference of a torque reversal.

BRIEF DESCRIPTION OF THE INVENTION

The multiple-function mechanical clutch of the present invention represents a solution to the engine braking problem by providing a clutch with bidirectional control in two states. This would make it possible for the clutch to function in both a driving condition and a coast-down, engine-braking condition without the necessity for complex torque transfer direction sensors or controls for anticipating a torque reversal.

A clutch used in this fashion is analogous to an on-off switch. It effects instantaneous braking or release of a torque transfer shaft if relative motion exists between the shaft and the inner race. It minimizes rotational inertia of relatively rotating components compared to rotational inertia of a conventional overrunning clutch or brake system in a multiple-ratio transmission. It can be used during multiple ratio transmission shifting events in combination with engine input torque control to achieve smooth ratio transitions.

The clutch of the present invention includes an outer cam race, an inner cam race and circular clutch elements or rollers situated in recesses in the inner surface of the outer race and the outer surface of the inner race. The inner race is split, thereby forming split race ends. The recesses define ramps that cooperate with the rollers so that a radial force is applied to the inner race as the inner race tends to shift angularly relative to the outer race. This decreases the effective inner diameter of the split inner race inner surface so that a torque delivery shaft extending through the inner race is frictionally engaged by the inner race.

The clutch of the present invention provides a connect/disconnect logic analogous to the logic of a mechanical switch. The switch is actuated by external hydraulic pressure. A net clearance is provided between the inner surface of the inner race and the outer surface of the shaft about which the inner race is mounted. This clearance minimizes the frictional drag of the device during overrunning conditions.

When the inner cam ring is in its free state, its inner diameter is greater than the outer diameter of the torque transfer shaft. It produces a uniform radial contact pressure on the surface of the torque transfer shaft when the hydraulic actuator is energized. As uniform pressure contact at the inner cam ring/shaft surface interface is produced, the drag force that is produced effects a self-energizing locking action of the clutch.

Provision is made for sealing the actuating pressure within a pressure chamber. Sealing is accomplished by using two side covers, which define in part the hydraulic pressure chamber. The side covers carry seals. An additional seal element is located between the ends of the inner race where the inner race is split.

When the actuating pressure is removed, the inner cam ring, by reason of its inherent resiliency, will have a free state such that an outward force on the rollers is produced, which pushes the rollers toward the low point of the ramps defined by the raised recesses.

According to one embodiment of the invention, the inner cam ring may contain one or more lubrication orifices which distribute oil to the shaft surface at the beginning of the clutch actuator sequence. These orifices meter distribution of oil to the shaft surface. When the inner race of the clutch engages the shaft, the orifices are closed. Thus oil is delivered to the shaft only when the relative motion exists between the shaft and the inner race. Also, the sizing of the orifices is such that they do not impede the buildup of hydraulic pressure within the pressure chamber.

BRIEF DESCRIPTION OF THE FIGURES OF THE DRAWINGS

FIG. 2 is an alternate embodiment of the invention wherein three separate pressure chambers are used for actuating the inner race to effect a neutral condition of the clutch, a bidirectional lockup of the clutch or unidirectional lockup of the clutch.

FIG. 3 is another embodiment of the invention wherein a single pressure chamber is used to establish a hydrostatic pressure force on the inner race throughout the entire periphery of the inner race.

FIG. 3a is an emerged view of a seal used to seal the gap between the split ends of the inner race for the clutch of FIG. 3.

FIG. 3b is an isometric view showing a modified form of a seal used at the gap produced by the split ends of the inner race of the clutch shown in FIG. 3.

FIG. 4 shows another alternate design for a seal used at the gap between the split ends of the inner race for the clutch of FIG. 3.

FIG. 5 is a plan view of an end plate with two O-ring seals that are used to seal the pressure chamber for the hydraulic actuator.

FIG. 6 is an isometric exploded view of the elements of the clutch of the present invention including the housing that surrounds the inner and outer races.

PARTICULAR DESCRIPTION OF THE INVENTION

Figure 1:
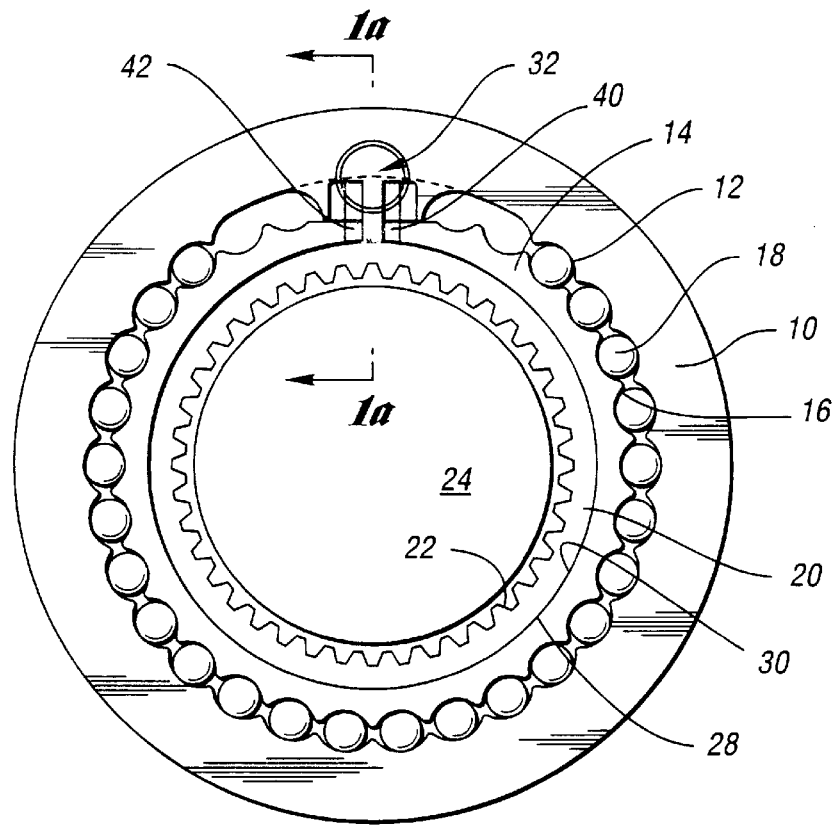
FIG. 1 is an end view of a clutch assembly embodying the improvements of the invention.

In FIG. 1, numeral 10 designates the outer race of the mechanical clutch of the invention. It is provided with peripherally spaced recesses 12 on its internal surface. An inner race 14 is situated concentrically within the race 10. Race 14 is provided with recesses 16 at its outer surface. The recesses 16 are situated radially adjacent recesses 12. The juxtaposition of the recesses 16 and 12 define spaces in which are situated rollers 18. The sides of the recesses define ramps that are engaged by the rollers 18.

A ring 20 is received in the inner race 14, as shown in FIG. 1. Ring 20 has internal spline teeth 22 which engage external spline teeth on a central torque transfer shaft 24. The teeth for the shaft 24 are shown at 26 in FIG. 1a.

The external surface 28 for the ring 20 engages internal surface 30 of the inner race 14. A slight frictional drag is established at the interface of the surfaces 28 and 30. Thus, when the shaft 24 rotates relative to the inner race 14, the slight frictional drag torque tends to shift the inner race 14 relative to the outer race 10, thereby causing the rollers 18 to ramp against the ramp surfaces of the recesses 16 and 12. This exerts a radial force on the inner race 14, thereby locking the race 14 to the shaft 24.

If the direction of rotation of the shaft 24 should reverse relative to the inner race 14, the slight frictional drag at the interface of the surfaces 28 and 30 will shift the inner race 14 in the opposite direction. This shifting motion creates a ramping action of the rollers 18 with the opposite ramp surfaces of the recesses 16 and 12, thereby locking the race 14 to the shaft 24. The clutch illustrated in FIG. 1 thus functions as a brake that prevents relative rotation of the shaft 24 with respect to the races 14 and 10 in each direction. It permits freewheeling motion, however, if the inner race 14 is expanded to relieve the frictional contact of the inner race 14 with respect to the race 20 at the interface of the surfaces 28 and 30. This tangential expansion of the inner race 14 is accomplished by the hydrostatic pressure actuator shown generally at 32.

Figure 1A:
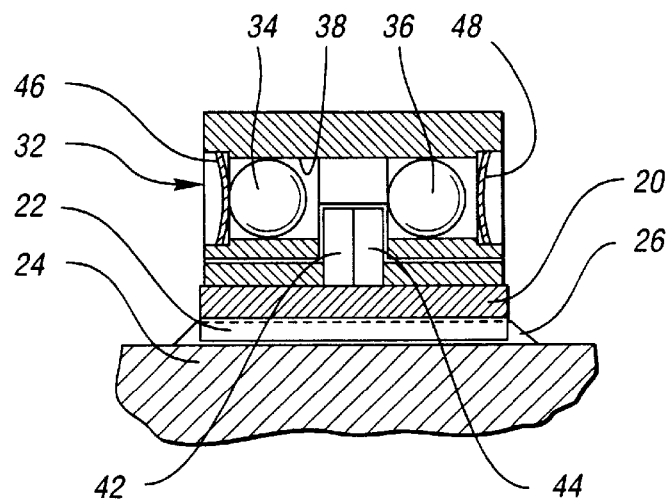
FIG. 1a is a partial cross-sectional view of the clutch of FIG. 1 as seen from the plane of section line 1a–1a of FIG. 1.

The actuator 32 comprises a pair of actuator balls 34 and 36 located in a transversely extending opening 38 in the race 10, as best seen in FIG. 1a.

The end of the race 14 is split, as best seen in FIG. 1. One of the split ends is provided with a ramp surface 40 and the other split end is provided with a ramp surface 42. The ball 34 engages the ramp surface 42 when it is shifted in a right-hand direction as viewed in FIG. 1a. The other ball 36 is adapted to engage a ramp surface 44 at the end of the split ring 14 adjacent ramp surface 42, as best seen in FIG. 1a.

The opening 38 is sealed at one end by a fluid seal 46. A corresponding fluid seal 48 seals the opposite end of the opening 38 when pressure is applied to the left side of the ball 34 and to the right side of the ball 36. The balls 34 and 36 will shift toward the center of the clutch structure and will engage ramp surfaces 42 and 44, respectively. This creates a tangentially directed force on one of the split ends of the inner race 14. The other split end of the inner race 14 also is engaged by the balls 34 and 36. The other split end has ramps corresponding to the ramps 42 and 44. One of these ramps is shown at 40 in FIG. 1.

The pressure forces on the balls 34 and 36 are balanced, one with respect to the other, so that a net axial force on the inner race 14 is zero.

When the balls 34 and 36 are pressurized, and the inner race 14 expands due to the tangential force acting on the split ends of the race 14, the frictional drag at the inner face of the surfaces 28 and 30 will be removed, thereby permitting the shaft 24 to rotate freely in each angular direction relative to the inner race 14. The pressurization of the balls 34 and 36 will cause the rollers 18 to ride to the center location of the ramp surfaces defined by the recesses 16 and 12.

Figure 1B:
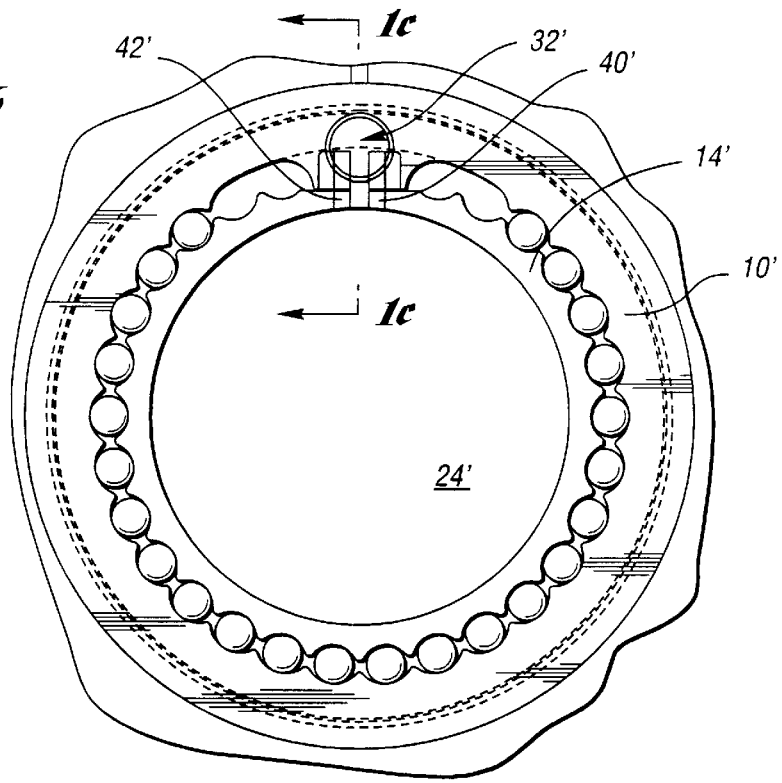
FIG. 1b is a view similar to FIG. 1 but which does not include a splined torque transfer shaft, as in the case of FIG. 1.

In the embodiment of the clutch shown in FIG. 1b, the inner race 14' has an inner surface that directly engages the shaft shown at 24'. In the embodiment of FIG. 1b, the elements that have corresponding elements in the embodiment of FIG. 1 have been indicated by similar reference characters, although prime notations are added.

Figure 1C:
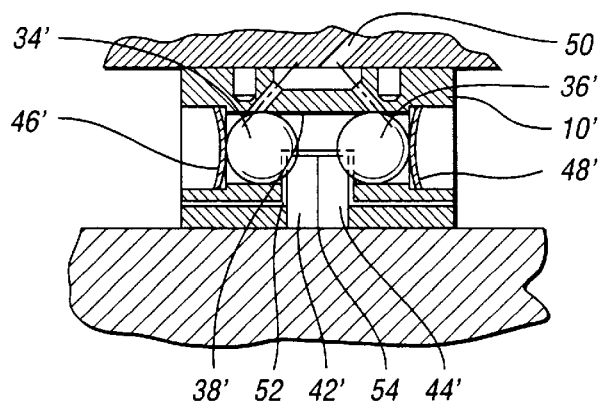
FIG. 1c is a partial cross-sectional view as seen from the plane of section line 1c–1c of FIG. 1b.

In FIG. 1c, there is shown fluid pressure passages for pressurizing the left side of the ball 34' and the right side of the ball 36'. These passages include a radial passage 50, which communicates with passages 52 and 54. These extend, respectively, to the left side of the ball 34' and to the right side of the ball 36'. Passage 50 can be formed in a housing structure such as a transmission case. The passages 52 and 54 are formed in the outer clutch race 10'.

Figure 1D:
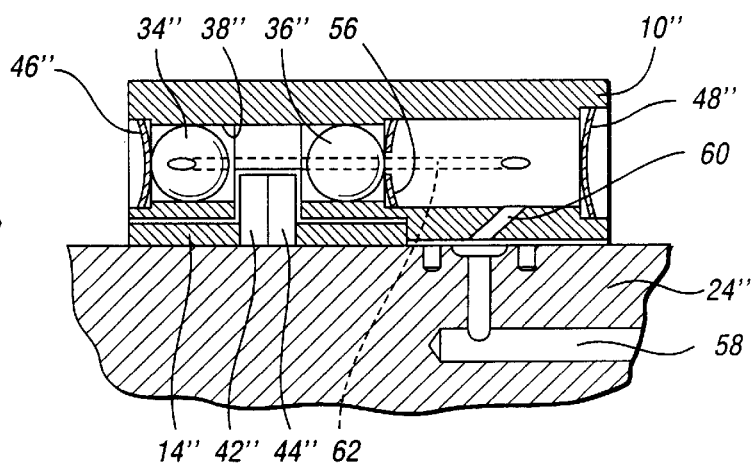
FIG. 1d is a view similar to FIG. 1c but which shows a modified hydraulic actuator for energizing the clutch of FIG. 1b.

In FIG. 1d, opening 38" is longer than the corresponding opening 38' of the embodiment of FIG. 1c. It includes a seal 48" at the right end of the opening 38'. A second wall or stop 56 is secured to the interior of the opening 38" at the right-hand side of the ball 36". Internal passage 58 in shaft 24" communicates through a radial passage with port 60 formed in the race 10". Opening 38" at the right-hand side of the stop 56 communicates through cross-over passage 62 with the left-hand side of the opening 38 at the left-hand side of the ball 34". Thus, when pressure is distributed to the passage 58, a pressure force is exerted on the left side of the ball 34" and the right side of the ball 36". This causes the balls to engage the ramp surfaces shown at 42" and 44", which causes the inner race to expand, thereby relieving frictional drag between the shaft 24" and the inner race 14".

Shown in FIG. 2 is an embodiment of the invention which will permit freewheeling motion of the shaft relative to the clutch in each direction, one-way clutching action during relative rotation of the shaft in each direction, and braking action which prevents rotation of the shaft relative to the clutch in either direction. This multiple function is achieved by providing opposed pressure chambers adjacent the split ends of the inner race.

The clutch of FIG. 2 includes an outer race 66 and an inner race 68 which correspond respectively to the races 10 and 14 of the embodiment of FIG. 1. As in the case of the embodiment of FIG. 1, the race 66 has internal recesses 70, and the inner race 68 has external recesses 72. These recesses define ramps that are engaged by rollers 74 situated between the races.

The inner race 68 surrounds torque transfer shaft 76. Unlike the embodiment of FIG. 1 where the inner race engages the race 20 to establish a frictional drag at the interface of the outer surface of the race 20 and the inner surface of the race 14, the race 68 of the embodiment of FIG. 2 does not frictionally engage the surface of the shaft 76 when the race 68 is in its free state. A clearance, which may be approximately 0.005, inch exists between the surface of the shaft 76 and the inner surface of the inner race 68.

As in the case of the embodiment of FIG. 1, the race 68 is split to provide two adjacent ends that define a gap 78. One of the split ends has an inner ear 80, and the other split end has a companion ear 82. Located between the ears is a flexible seal 84.

The gap 78 communicates with a radial passage 86 formed in the housing 88 in which the clutch structure is assembled.

The outer race 66 has fixed peripheral extensions 90 and 92 adjacent the gap between the split ends of the inner race 68. The ear 80 slidably contacts the extension 90, and the ear 82 slidably contacts the extension 92. The ears 80 and 82 cooperate with the inner and outer races 66 and 68 to define a pair of pressure chambers 94 and 96. A first seal 98 isolates the pressure chamber 94 from the annular space between the races 66, 68. Similarly, seal 100 isolates the pressure chamber 96 from the annular space between the races.

A third seal 102 is situated between the ears 80 and 82 for the purpose of sealing the gap between the split ends of the inner race 68.

A clearance between the shaft 76 and the inside diameter of the inner race 68 permits freewheeling motion of the shaft relative to the race. This clearance reduces the frictional drag of the device during overrunning of the clutch in either direction. The pressure chambers 78, 94 and 96 can be separately and selectively pressurized depending on the function that is desired. If pressure chamber 94 is pressurized and pressure chambers 78 and 96 are not pressurized, the shaft will become locked to the inner race when torque is applied to the shaft in a counterclockwise direction. The shaft 76 can freewheel in the opposite direction. On the other hand, when pressure chamber 96 is pressurized and pressure chambers 78 and 94 are not pressurized, clockwise torque on the shaft 76 will cause the shaft 76 to become locked, although it can freewheel in the opposite direction. If pressure chamber 78 is pressurized and pressure chambers 96 and 94 are not pressurized, the shaft 76 can freewheel in both directions. It thus will not lock regardless of the direction of the torque delivered to the shaft 76.

If pressure chambers 96 and 78 are pressurized and pressure chamber 94 is not pressurized, the shaft 76 will lock up when a clockwise torque is delivered to it. When pressure chambers 96 and 94 are pressurized and pressure chamber 78 is not pressurized, the shaft 76 will lock when torque is delivered to it in either a clockwise direction or a counterclockwise direction. The housing that surrounds the inner and outer races is provided with a radial port 104.

The various functions of the clutch structure shown in FIG. 2 are summarized in the following table:

| Pressure | | | Direction Of |
| --- | --- | --- | --- |
| 96 | 78 | 94 | Rotation To Lock |
|  |  |  | both* |
|  | x |  | neither |
| x |  |  | cw |
|  |  | x | ccw |
| x | x |  | cw |
| x | x | x | area dependent |
|  | x | x | ccw |
| x |  | x | both |

*or neither, depending on whether the ring drags on the shaft or pushes against the rollers in its free state.

In the embodiment of FIG. 3, the elements that have a counterpart in the embodiment of FIG. 2 have been designated by similar reference characters, although prime notations are added. In the case of the embodiment of FIG. 3, a pressure chamber 106 is located between the split ends of the race 68'. A radial port 104 is adapted to deliver actuating pressure to the chamber 106.

A fluid, elastomeric seal 108 is located between the split ends of the inner race 68'. This seals the gap between the split ends.

When the pressure chamber 106 is pressurized, fluid pressure is distributed throughout the periphery of the race 68', thereby exerting a radial inward force on the race 68', causing it to frictionally engage the surface of the shaft 76'. This, in effect, causes the shaft 76' to be locked to the inner race 68' whenever the passage 106 is pressurized, thereby preventing relative rotation of the shaft 76' in either direction. When the pressure is relieved from the chamber 106, the inherent resiliency of the inner race 68' will establish a gap between the surface of the shaft 76' and the inner surface of the race 68'. The inherent resiliency of the race 68' furthermore will cause the rollers 74' to reside in the low points of the ramps defined on the inner surface of the outer race 66'.

The gap seal 108 is shown in better detail in FIG. 3a. It includes a generally rectangular portion 110 and a radial portion 112 extending in a radial inward direction from the rectangular section 108. A pair of flexible lips 114 and 116 is formed at the radial inward end of the portion 112. These extend generally upward. The seal lips engage the radial inward portion of the gap between the split ends of the race 68'. The radial outward region of the gap between the split ends of the race 68' engages the rectangular portion 108. The seal 108 is flexible enough to permit the split ends of the race 68' to compress the seal as the radially directed pressure force acting on the race 68' decreases the diameter of the race 68'.

FIG. 6 shows a housing 110 that can be used with any of the embodiments previously described. It includes the central opening 112 that receives the torque delivery shaft. Surrounding the opening 112 is a circular O-ring seal 115 which is engageable with the radial surface of the inner race 116 as shown in FIG. 6. This race corresponds to the inner races 14, 14' and 68 previously described. The outer race 118 surrounds the inner race 116 and is adapted to be received in the housing 110 and secured therein by bolts 120.

An end plate 122 shown in FIG. 5 has a first circular O-ring 124 and a second circular O-ring 126 concentric to the O-ring 124. The O-ring 126 is adapted to engage the side planar surface of the race 118 and the O-ring is adapted to engage the side planar surface of the inner race 116. The plate 122, as best seen in FIG. 6, can be assembled to the side of the inner and outer races within the housing 110 using the bolts 120.

The residual force that is effected by the expanded free state of the inner race will push the rollers to the low point of the cam ramps, thereby maintaining the correct angular position of the inner race relative to the outer race. The profile of the cams can be selected depending upon the timing requirements for clutch engagement and disengagement.

If desired, the inner race can be provided with a small radial lubrication orifice which will allow oil to be discharged onto the surface of the shaft. At the beginning of the switch actuation sequence, the orifices would meter the oil onto the shaft at the interface of the shaft surface and the inner surface of the inner race. The orifices would be blocked when the inner race engages the outer surface of the shaft, but lubrication in that event is not required since no relative rotation would occur between the inner race and the shaft.

FIG. 3b shows an alternate construction for the seal shown in FIG. 3a. The seal of FIG. 3b is designated by reference character 108'. Like the seal shown in FIG. 3a, the seal shown in FIG. 3b has a rectangular section 110' and a radially inwardly extending section 112. The axial ends of the radially inward section 112 have formed therein arcuate recesses 118 and 120 which are adapted to receive the O-ring seals 124 and 115. This serves to support the seal 108' when the pressure applied to the seal is insufficient to cause sealing engagement of the surface 128 against the surface 130 of the split ends of the inner race 68'. This can best be seen by referring to FIG. 4.

Although preferred embodiments of the invention have been described, modifications may be made by persons skilled in the art without departing from the scope of the invention. All such modifications and equivalents thereof are included within the scope of the following claims.

What is claimed is:

1. A controllable, multiple-function clutch comprising concentric inner and outer races with inner and outer peripheral surfaces, the inner race having a circular central opening;
    a torque delivery shaft extending through the circular opening;
    the outer peripheral surface of the inner race having external ramp recesses;
    the inner peripheral surface of the outer race having internal ramp recesses;
    a plurality of circular clutch elements between the inner and outer races, each clutch element being located in an external recess and in an internal recess whereby the clutch elements are wedged between the inner and outer races as the races shift angularly, one with respect to the other;
    the inner race being split to define split ends with a peripheral gap therebetween; and
    a fluid pressure actuator located at the peripheral gap for exerting a pressure force on the inner race to effect locking engagement of the clutch elements.

2. The clutch set forth in claim 1 wherein the fluid pressure actuator comprises a pressure chamber, a clutch release element in the pressure chamber;
    the clutch release element engaging a split end of the inner race to increase the diameter of the inner race, thereby effecting movement of the clutch elements toward a wedging portion between the races.

3. The clutch set forth in claim 2 wherein the split ends of the inner race are formed with ramp end surfaces, the clutch release element engaging the ramp end surfaces as it is shifted by hydraulic pressure against the ramp end surfaces.

4. The clutch set forth in claim 3 wherein the pressure actuator comprises two clutch release elements on opposed axial sides of the inner race, each clutch release element being engageable with a ramp end surface of the inner race whereby axially directed pressure forces acting on the clutch release elements are balances thereby effecting a net axial force of approximately zero on the clutch release elements.

5. A controllable, multiple-function clutch comprising concentric inner and outer races with inner and outer peripheral surfaces, the inner race having a circular central opening;
    a torque delivery shaft located in the peripheral opening, the shaft and the inner race having a radial clearance therebetween;
    the outer peripheral surface of the inner race having external ramp recesses;
    the inner peripheral surfaces of the outer race having internal ramp recesses
    a plurality of circular clutch elements between the inner and outer races, each clutch element being located in an external recess and in an internal recess whereby the clutch elements are wedged between the inner and outer races as the races shift angularly, one with respect to the other;
    the inner race being split to define split ends with a peripheral gap therebetween;
    a fluid pressure chamber at the peripheral gap; and
    passage structure communicating with the fluid pressure chamber for distributing actuating pressure around the outer peripheral surface of the inner race whereby a radially directed pressure force is applied to the inner race to decrease the diameter of the inner race to effect frictional engagement of the inner peripheral surface of the inner race with the shaft.

6. The clutch set forth in claim 5 wherein the fluid pressure chamber is defined in part by circular seals that surround the shaft and that sealingly engage the inner and outer races to contain pressure in the pressure chamber.

7. A controllable, multiple-function clutch comprising concentric inner and outer races with inner and outer peripheral surfaces, the inner race having a circular central opening;
    a torque delivery shaft located in the central opening, the shaft and the inner race having a radial clearance therebetween;
    the outer peripheral surface of the inner race having external ramp recesses;
    the inner peripheral surfaces of the outer race having internal ramp recesses
    a plurality of circular clutch elements between the inner and outer races, each clutch element being located in an external recess and in an internal recess whereby the clutch elements are wedged between the inner and outer races as the races shift angularly, one with respect to the other;

the inner race being split to define split ends with a peripheral gap therebetween; and at least one fluid pressure chamber at the peripheral gap defined by the split ends of the inner race whereby the pressure in the pressure chamber creates a tangential force on the split ends to expand the diameter of the inner race and interrupt frictional engagement of the inner race and the shaft.

8. The clutch set forth in claim 7 including first, second and third pressure chambers at the peripheral gap, each pressure chamber being defined in part by a separate one of the split ends of the inner race; and passage structure for selectively pressurizing and depressurizing the pressure chambers whereby the clutch effects selective locking of the races against relative motion in each direction and in one direction only and wherein overrunning motion of the races in each direction is effected.

* * * * *